(12) United States Patent
Cheung

(10) Patent No.: US 10,816,154 B2
(45) Date of Patent: Oct. 27, 2020

(54) LIGHTING DEVICE

(71) Applicant: Wing Kit Cheung, Hong Kong (CN)

(72) Inventor: Wing Kit Cheung, Hong Kong (CN)

( * ) Notice: Subject to any disclaimer, the term of this patent is extended or adjusted under 35 U.S.C. 154(b) by 0 days.

(21) Appl. No.: 16/402,234

(22) Filed: May 3, 2019

(65) Prior Publication Data
US 2019/0338905 A1    Nov. 7, 2019

(30) Foreign Application Priority Data

May 7, 2018 (CN) ..................... 2018 2 0670528 U

(51) Int. Cl.
| | | |
|---|---|---|
| *F21S 10/04* | (2006.01) | |
| *F21S 6/00* | (2006.01) | |
| *F21V 5/04* | (2006.01) | |
| *F21V 14/02* | (2006.01) | |

(52) U.S. Cl.
CPC ............. *F21S 10/046* (2013.01); *F21S 6/001* (2013.01); *F21V 5/04* (2013.01); *F21V 14/02* (2013.01)

(58) Field of Classification Search
None
See application file for complete search history.

(56) References Cited

U.S. PATENT DOCUMENTS

| | | | | |
|---|---|---|---|---|
| 2009/0091262 | A1* | 4/2009 | Takatsuka | H05B 41/2851 315/119 |
| 2015/0049472 | A1* | 2/2015 | Lai | F21S 10/046 362/186 |
| 2017/0339774 | A1 | 11/2017 | Wang | |

FOREIGN PATENT DOCUMENTS

| | | |
|---|---|---|
| CN | 203814003 | 9/2014 |
| CN | 204291473 | 4/2015 |
| CN | 104661363 | 5/2015 |

* cited by examiner

*Primary Examiner* — Ashok Patel
(74) *Attorney, Agent, or Firm* — Eagle IP Limited; Jacqueline C. Lui

(57) ABSTRACT

One example embodiment provides a lighting device. The lighting device includes a lighting component, at least one coil, and a driving circuit. The lighting component connects with a movable magnet to project light on a flame sheet from different positions. The coil is disposed adjacent to the movable magnet to apply a magnetic force to move the movable magnet in response to a driving current in the coil. The driving circuit connects with the coil and the lighting component to provide the driving current according to a characteristic parameter of an electronic signal converted from an audio signal. The characteristic parameter includes one or more of an amplitude, a frequency and an envelope of the electronic signal. The lighting component moves with a speed and a direction controlled by the audio signal.

20 Claims, 7 Drawing Sheets

LIGHTING DEVICE

FIELD OF THE INVENTION

The present invention relates to a lighting device, and more particularly to an electronic lighting device that mimicking a candle flame.

BACKGROUND

In contemporary society, in addition to basic functions such as warming and cooking, fire is increasingly bearing cultural, ornamental, and aesthetic factors in human life. A variety of flames can create a variety of atmospheres in life, making people feel relaxed, cheerful or quiet. Electronic flames are popular and widely used because they are environmentally friendly, low-cost and the electronic light-emitting devices have long-lasting lives to simulate combustion.

New electronic lighting devices for mimicking flames will assist in the advancement of the technology and meet the demanding need of applications.

SUMMARY OF THE INVENTION

One example embodiment provides a lighting device. The lighting device includes a lighting component, at least one coil, and a driving circuit. The lighting component connects with a movable magnet to project light on a flame sheet from different positions. The coil is disposed adjacent to the movable magnet to apply a magnetic force to move the movable magnet in response to a driving current in the coil. The driving circuit connects with the coil and the lighting component to provide the driving current according to a characteristic parameter of an electronic signal converted from an audio signal. The characteristic parameter includes one or more of an amplitude, a frequency and an envelope of the electronic signal. The lighting component moves with a speed and a direction controlled by the audio signal.

One example embodiment provides a method of using an audio signal for controlling a light image generated from at least one lighting device. The method includes converting an audio signal received from an environment around the lighting device into an electronic signal by a sensing unit; extracting a characteristic parameter from the electronic signal by an extraction unit; modulating a control parameter of a control signal according to the characteristic parameter of the electronic signal by a modulation unit; generating a driving current according to the control parameter of the control signal by a driving circuit; and providing the driving current by the driver circuit to at least one coil adjacent to a magnet that connects with the lighting device so that the coil applies a magnetic force on the magnet; providing the driving current by the driver circuit to the lighting device so that the intensity of the light image varies with the driving current. The characteristic parameter includes one or more of an amplitude, a frequency and an envelope of the electronic signal. The magnetic force changes in response to the characteristic parameter. The lighting device moves in response to the magnetic force so that the light image flickers.

One example embodiment provides an electronic candle that produces an image of a candle flame that flickers with an audio signal. The electronic candle includes a housing, a sensing unit, a flame sheet, a lighting component, at least one magnet, at least one coil, a driving circuit, a modulation unit, and an extraction unit. The housing has a top surface with an opening. The sensing unit is in the housing, and it acquires the audio signal from an environment of the electronic candle and converts the audio signal into an electronic signal. The flame sheet is on the top surface of the housing adjacent to the opening. The lighting component projects light on the flame sheet to produce the image of the candle flame through the opening. The magnet is enclosed inside the housing. A movement of the magnet changes an optical path from the lighting component to the flame sheet. The coil is disposed adjacent to the magnet to generate a magnetic force to move the magnet when a driving current is passing through the coil. The driving circuit that electrically connects with the coil for providing the driving current according to a control signal. The modulation unit that electrically connects with the driving circuit, and it modulates the control signal according to a characteristic parameter of an electronic signal. The extraction unit electronically connects with the modulation unit, and extracts the characteristic parameter from the electronic signal that is converted from the audio signal. The characteristic parameter of the electronic signal includes one or more of an amplitude, a frequency and an envelope of the electronic signal to cause the image of the candle flame resembles ignition, growth, spread, decay and extinction of a real candle flame.

Other example embodiments are discussed herein.

DETAILED DESCRIPTION

Figure 1:
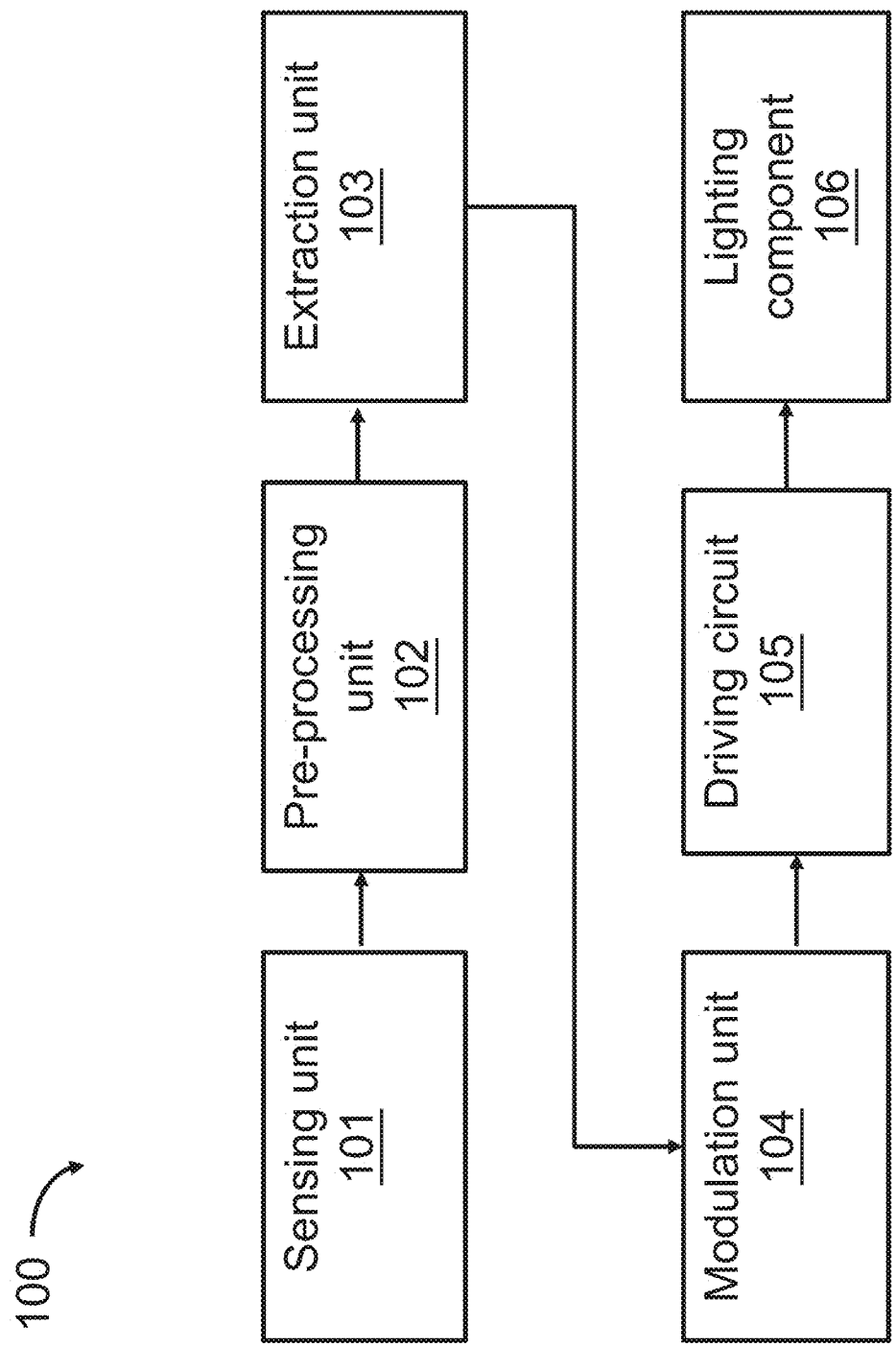
FIG. 1 shows a block diagram of a lighting device in accordance with an example embodiment.

Example embodiments relate to lighting devices with novel structure designs and improved performances, which can respond to audio signals and mimic flickering flames vividly.

Electronic flames are often used for decoration or creation of a warm atmosphere without the risk of fire hazards inherently associated with real flames. Some existing electronic candles have a transparent or translucent physical structure enclosing a light-emitting diode (LED). This kind of electronic candles, while bearing physical resemblance to a real candle, emits light that does not flicker. Alternatively, other conventional electronic flames employ soft and thin flame-shaped strips made of materials such as silk, cloth, or paper to enclose the LED. While the light emitted from the LED itself does not flicker, the upwards air flow created by an integrated fan produces a dynamic movement of the strips that mimics the flickering flame.

The conventional electronic lighting devices mentioned above are either ordinary static light in a candle shape, or electronic flames that moves randomly to mimic real flames. However, in some circumstances, it is desirable for the electronic flames to cooperate with the environmental sound and change the flames accordingly to create different atmospheres.

One or more example embodiments solve the technical problem associated with conventional lighting devices as set forth above. One or more example embodiments achieve lighting devices with improved performance by generating a light image responding to audio signals such as music, and thus contribute to the technology of electronic flames.

One example embodiment provides a lighting device that includes a lighting component, at least one coil, and a driving circuit. The lighting component connects with a movable magnet and the coil is disposed adjacent to the magnet. The driving circuit provides a driving current to the coil and/or the lighting component according to the characteristic parameters of an electronic signal converted from an audio signal.

The audio signals are received from an audio source and converted to the electronic signals by a sensing unit. The characteristic parameters, which includes amplitude, frequency, and envelope of the electronic signals are then extracted for modulating a control signal. The control signal is fed into the driving circuit to control the driving current, and thus the driving current changes with the audio signals.

When the driving current is applied to the lighting component, the lighting intensity and flickering frequency of the lighting component can change with the driving current, which is actually controlled by the audio signal. When the driving current is further applied to the coil, the coil generates a magnetic force to move the magnet, and the position of the lighting component connected with the magnet changes accordingly so that the light image projected by the lighting component on a flame sheet changes. As a result, the lighting component moves with a speed and a direction controlled by the audio signal and the light image projected by the lighting component flickers with the audio signal to perform a controllable and vivid simulation of real flames.

Example embodiments provide lighting devices that can subtly combine the flickering effect of the light image with the intensity of the ambient sound or the intensity, speed, or tune of the music or any selected audio input, so as to bring a harmonized and enhanced hearing and visual enjoyment to the user.

FIG. 1 shows a block diagram of a lighting device 100 in accordance with an example embodiment.

Referring to FIG. 1, the lighting device 100 includes a sensing unit 101, a pre-processing unit 102, an extraction unit 103, a modulation unit 104, a driving circuit 105 and a lighting component 106 that are connected in sequence.

The sensing unit 101 senses audio signals and converts the audio signals into electronic signals. The pre-processing unit 102 pre-processes the electronic signals and output the electronic signals to the extraction unit 103. The extraction unit 103 generates the characteristic parameters of the electronic signals for the modulation unit 104 to generate a control signal. And the driving circuit 105 generates and provides a driving current to the lighting component according to the control signal. As such, the light emitted by the lighting component 106 changes with the input audio signals.

In one example embodiment, the lighting component 106 is a component that can emit light when applying a current. For example, the lighting component 106 is an LED.

In one example embodiment, the sensing unit 101 includes an audio transducer, and the audio transducer includes a microphone.

In one example embodiment, the pre-processing unit 102 includes an amplifier, a filter and an A/D converter.

In one example embodiment, the characteristic parameter includes one of more of the amplitude, the frequency and envelope of the electronic signals.

In one example embodiment, the driving circuit 105 provides at least one driving current according to the control signal to control the intensity and/or the flickering frequency of the light emitted by the lighting component 106. By way of example, a larger amplitude in the characteristic parameter, i.e. a larger amplitude of the electronic signal, results in a control signal that generates a driving current with a larger amplitude or a higher frequency. Consequently, a higher intensity and/or the flickering frequency of the light emitted by the lighting component 106 is achieved. In a similar way, the frequency and the envelope in the characteristic parameters can also control the intensity and/or the flickering frequency of the light emitted by the lighting component 106.

In one example embodiment, when more than one characteristic parameter are applied, each characteristic parameter can be used to control one performance of the lighting device. For example, the amplitude of the electronic signals is used to control the lighting intensity of the lighting device, and the frequency of the electronic signals is used to control the flickering frequency of the lighting. In another example embodiment, multiple characteristic parameters are integrated to control one performance of the lighting device. For example, the amplitude and the frequency of the electronic signals control the intensity/frequency of the lighting collaboratively. Furthermore, a weight can be set among the effects of the multiple characteristic parameters.

In one example embodiment, the modulation unit 104 further includes a pre-setting module that can provide pre-determined characteristic parameter for modulating the control signal. Therefore, the light image projected by the lighting device can be controlled by the pre-determined characteristic parameter when there is no input audio signal, and it can also be controlled by a combination of the pre-determined characteristic parameter together with the characteristic parameter extracted from the audio signals, and thus achieve a flexible control of the flickering.

In one example embodiment, at least one lighting component 106 is driven by the driving circuit 105. For example, an array of lighting components 106 are driven by the same driving circuit 105 simultaneously so that all the lighting components flicker in the same rhythm with the audio input to create an even better visual effect.

Figure 2:
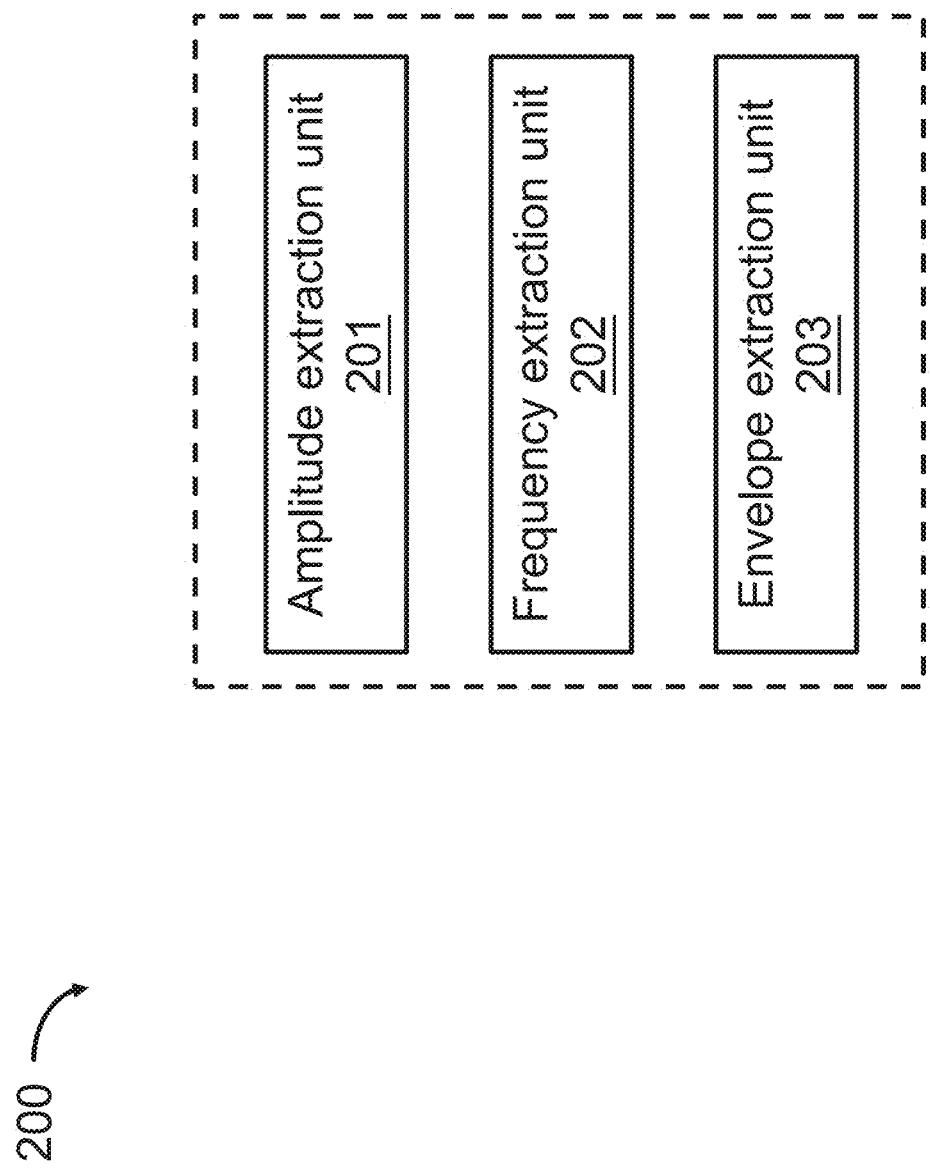
FIG. 2 shows a block diagram of an extraction unit in accordance with an example embodiment.

FIG. 2 shows a block diagram of an extraction unit 200 in accordance with an example embodiment.

Referring to FIG. 2, the extraction unit 200 includes an amplitude extraction unit 201 for extracting the amplitude of the electronic signals, a frequency extraction unit 202 for extracting the frequency of the electronic signals, and an envelope extraction unit 203 for extracting the envelope of the electronic signals. The amplitude extraction unit 201, the frequency extraction unit 202 and the envelope extraction unit 203 perform one or more signal processing method to extract the amplitude, the frequency and the envelope of the electronic signals respectively.

In one example embodiment, the extraction unit 200 includes one or more of the amplitude extraction unit 201, the frequency extraction unit 202 and the envelope extraction unit 203, and electrically connects with a driving circuit for providing the amplitude, the frequency or the envelope of the electronic signals to the driving circuit.

Figure 3:
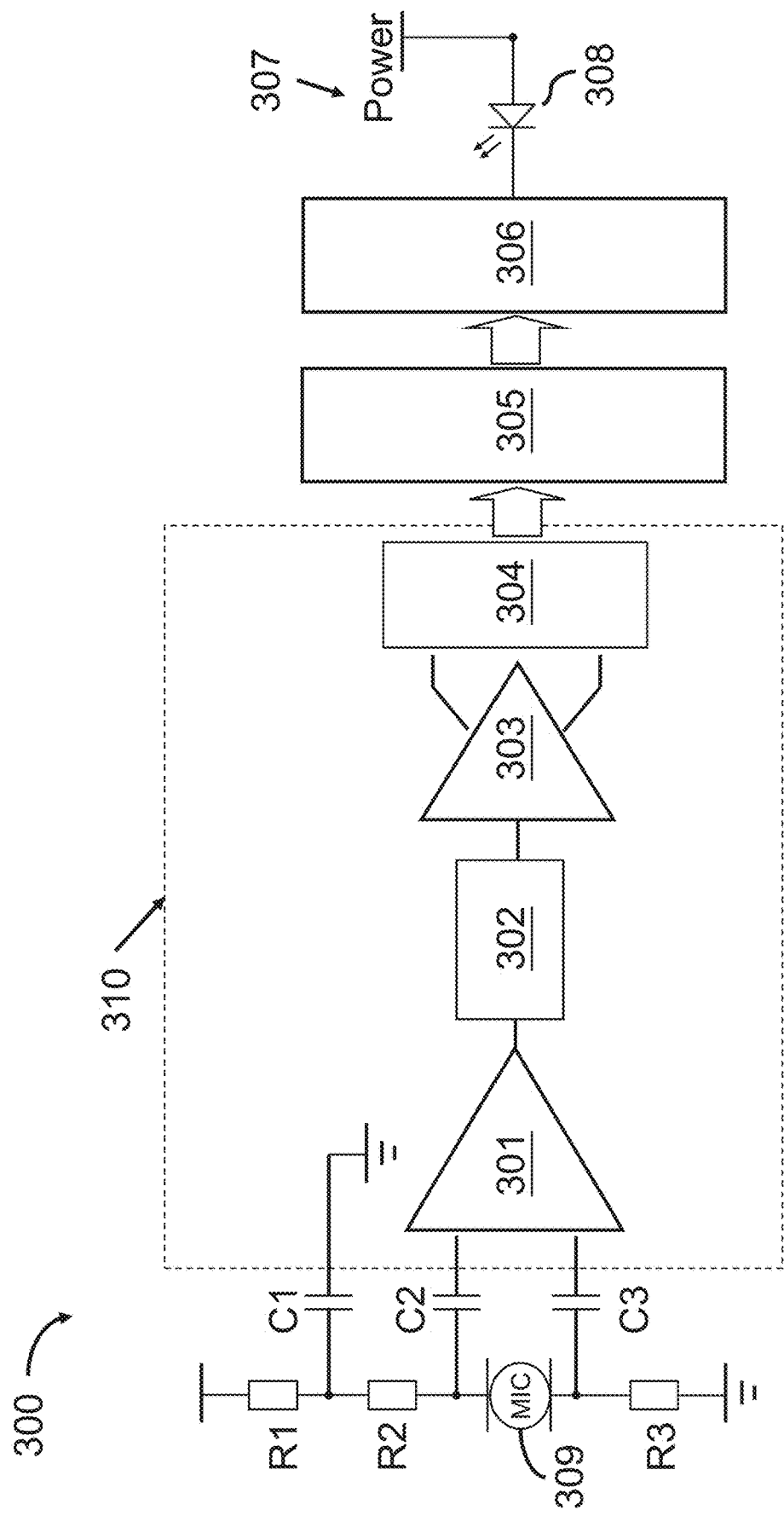
FIG. 3 shows a lighting device in accordance with an example embodiment.

FIG. 3 shows a lighting device 300 in accordance with an example embodiment.

Referring to FIG. 3, the lighting device 300 includes a sensing unit 309, a pre-processing unit 310, an extraction unit 305, a modulation unit 306, a driving circuit 307 and a lighting component 308 that are connected in sequence. The pre-processing unit 310 further includes an amplifier 301, a filter 302, a second amplifier 303 and an A/D converter 304 that are connected in sequence.

The sensing unit 309 acquires the audio signals from the environment and converts them into electronic signals. The pre-processing unit 310 is used for pre-processing the electronic signals received from the sensing unit 309 and sending the output to the extraction unit 305. Specifically, the amplifier 301 amplifies the voltage or the power of the electronic signals. The filter 302 filters the electronic signals, which keeps the useful signals without attenuation as much as possible and attenuates the unwanted signals as much as possible and sending the output to the second amplifier 303. After amplified by the second amplifier 303, the electronic signals are then input into the A/D converter 304 for converting from analogue signals into digital signals.

The extraction unit 305 extracts characteristic parameters of the electronic signals and the modulation unit 306 modulates a control signal with the characteristic parameters and provides the control signal to the driving circuit 307. The driving circuit 307 provides one driving current according to the control signal to control the intensity and/or the flickering frequency of the light emitted by the lighting component 308.

In one example embodiment, the filter 302 filters out the ambient noise in the electronic signals and keep the amplitude, frequency and envelope of the electronic signals.

In one example embodiment, the pre-processing unit 310 includes one or more of the amplifier 301, the filter 302, the second amplifier 303 and the A/D converter 304. The amplifier 301, the filter 302, the second amplifier 303 and the A/D converter 304 can be connected in a sequence different from that shown in FIG. 3.

In one example embodiment, the sensing unit 309 includes a microphone.

Figure 4:
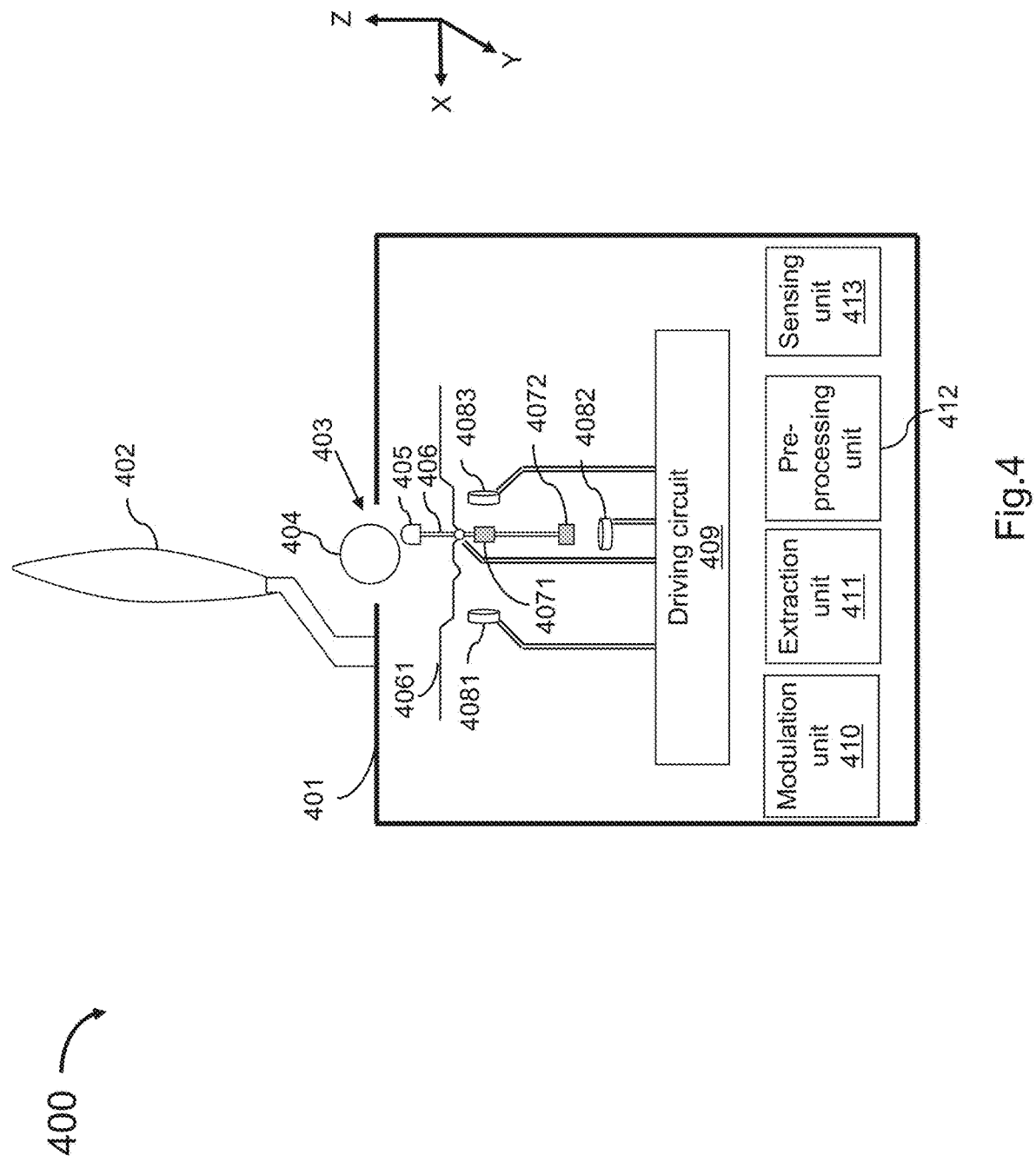
FIG. 4 shows an electronic candle in accordance with an example embodiment.

FIG. 4 shows an electronic candle 400 in accordance with an example embodiment.

Referring to FIG. 4, the electronic candle 400 includes a housing 401 that has an opening 403 on the top surface. A flame sheet 402 is installed on the top surface of the housing 401 adjacent to the opening 403. A lighting component 405 is enclosed inside the housing 401 and can project light to the flame sheet 402 through a lens 404 that is positioned at the opening 403 and between the lighting component 405 and the flame sheet 402. The flame sheet 402 is a shape of a candle flame.

The lighting component 405 is connected with a first magnet 4071 and a second magnet 4072 by a bracket 406 in the housing 401. The bracket 406 can sway, shake or vibrate with the lighting component 405 and the magnet 4071 and 4072. Two coils 4081 and 4083 are placed adjacent to the first magnet 4071 and one coil 4082 is placed adjacent to the second magnet 4072. All the coils 4081, 4082 and 4083 are connected and driven by a driving circuit 409 and can generate magnetic forces to move the magnet 4071 and 4072 in three different directions.

The housing 401 further encloses a sensing unit 413, a pre-processing unit 412, an extraction unit 411 and a modulation unit 410 that are connected in sequence. And the modulation unit 410 is further connected with the driving circuit 409.

In one example embodiment, when the sensing unit 413 acquires an audio signal from the environment of the electronic candle 400, it converts the audio signal into an electronic signal. The pre-processing unit 412 amplifies and filter the electronic signal and convert the electronic signal from an analogue signal into a digital signal. The extraction unit 411 extracts the characteristic parameters of the electronic signal, which includes one or more of an amplitude, a frequency and an envelope of the electronic signal for the modulation unit 410 to modulate a control signal. The control signal is then input into the driving circuit 409 to generate three driving currents that are provided to the coils 4081, 4082, 4083 respectively for generating magnetic fields to interact with the magnets 4071 and 4072. When the magnets 4071 and 4072 move with the lighting component 405 on the bracket 406, the image of the lighting on the flame sheet 402 can exhibit varying shapes, intensities and flickering frequencies that form a realistic simulated flame and the user can enjoy a visual effect that is heightened by the environmental audio input, e.g. a piece of music.

By way of example, the coil 4081 and the coil 4083 generates a magnetic force on the magnet 4071 in X and −X direction, in which -X is an opposite direction to X direction; and the coil 4082 generates a magnetic force on the magnet 4072 in Z direction, which is perpendicular to X direction. By way of example, X direction is horizontal and Z direction is vertical, so that the lighting component 405 can sway horizontally and vibrates vertically.

By way of example, the larger amplitude of the electronic signal results in a larger amplitude of the driving current, so that the swaying magnitude of the lighting component 405 is larger due to a larger magnetic force generated by the coils 4081, 4082, 4083 on the magnet 4071, 4072. Alternatively, the larger amplitude of the electronic signal can result in a larger frequency of the driving current, so that the light image projected by the lighting component 405 oscillates in a higher frequency as the magnetic force generated by the coils 4081, 4082, 4083 on the magnet 4071, 4072 changes more rapidly. Other characteristic parameters of the electronic signal, such as the frequency of the electronic signal, the envelope amplitude and envelope frequency of the electronic signals, can control the amplitude and frequency of the driving current in a similar way and thus control the magnitude and frequency of swaying and oscillating of the lighting component 405.

In one example embodiment, both the amplitude and frequency of the driving current can be controlled by one or more characteristic parameter. The amplitude and the frequency of the driving current can also be controlled separately by different characteristic parameters. When two or more characteristic parameter are combined to control the driving current, a weight value can be set among the effects of the characteristic parameters.

In one example embodiment, the driving circuit 409 further provides a driving current to the lighting component 405, so that lighting component 405 projects a light image on the flame shape 402 with varying lighting intensity and flickering frequency in addition to the swaying and oscillating movement of the lighting component 405 in response to the audio signal.

In one example embodiment, even when the driving circuit 409 ceases to provide driving currents to the coils 4081, 4082 and 4083, the lighting component 405 keeps swaying due to the effect of inertia.

In one example embodiment, the electronic candle 400 includes only one magnet and at least one coil that is placed adjacent to the magnet to generate at least one magnetic force to move the magnet. By way of example, the three coils 4081, 4082 and 4083 are placed adjacent to the sole magnet 4071 to generate three orthogonal magnetic forces on the magnet 4071.

In one example embodiment, the coil 4081 is configured to generate a magnetic force in X direction on the magnet 4071, and the coil 4083 is configured to generate a magnetic force in Y direction on the magnet 4071, in which both X direction and Y directions are in a horizontal plane and they are perpendicular to each other. The coil 4082 generates a magnetic force on the magnet 4072 in Z direction, which is perpendicular to both X direction and Y direction.

By way of example, a rod 4061 is disposed horizontally passing through an aperture of the bracket 406, wherein the diameter of the aperture is larger than the diameter of the rod 4061 and the rod 4061 has a concave shape to accommodate the bracket 406 such that the bracket 406 and the lighting component 405 can sway around and rest at the recess of the rod 4061 when a magnetic field is exerted on the magnet 4071 by the coils 4081 and 4083 in horizontal directions and can vibrate when a magnetic field is exerted on the magnet 4072 by the coil 4082 in vertical direction.

In one example embodiment, the lighting component 405 sways and/or flickers and/or vibrates in response to the magnitude and/or the direction of the magnetic force.

In one example embodiment, the flame sheet 402 can be of any shape, can be folded or can be a plain screen.

Figure 5:
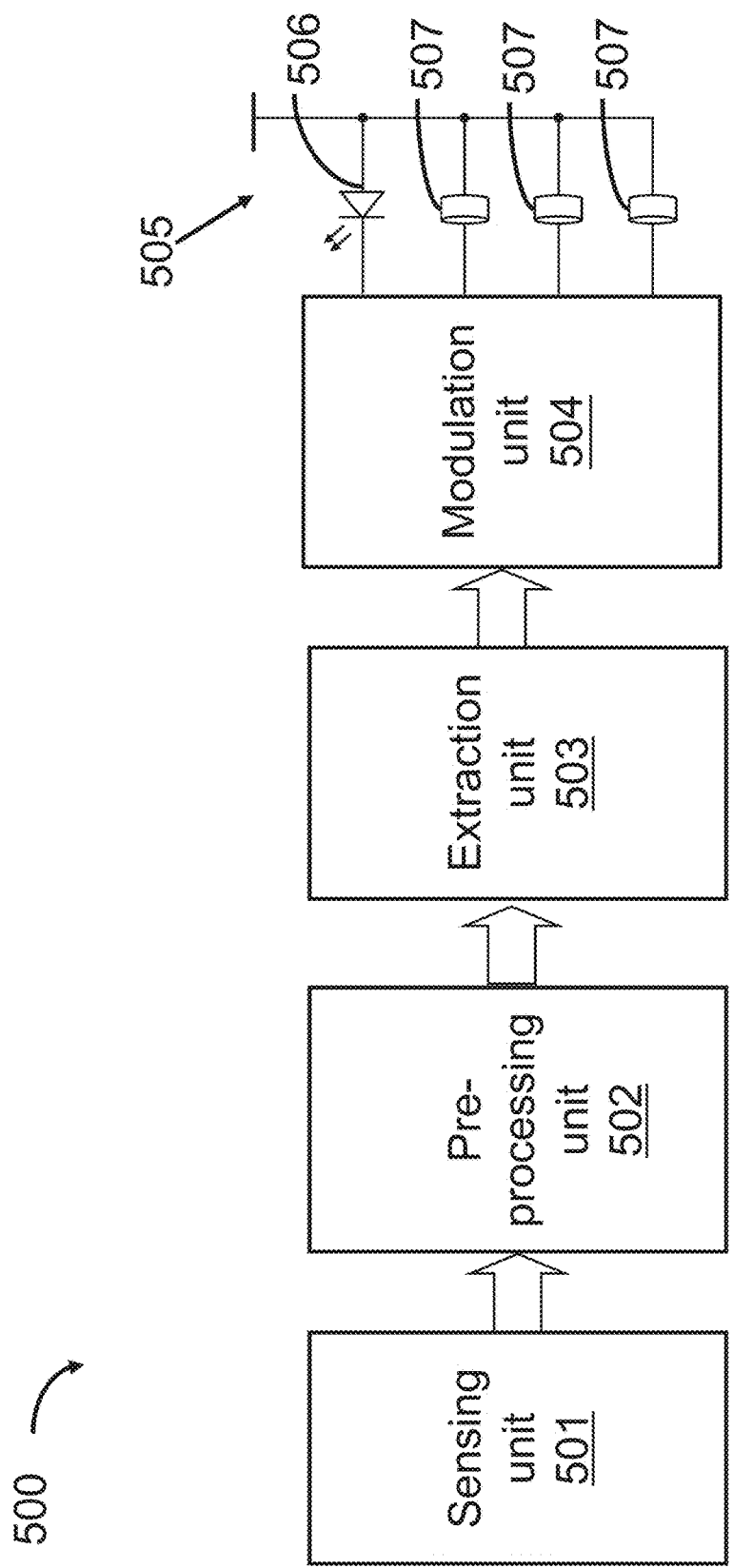
FIG. 5 shows a block diagram of a lighting device in accordance with an example embodiment.

FIG. 5 shows a block diagram of a lighting device 500 in accordance with an example embodiment.

In FIG. 5, the lighting device 500 includes a sensing unit 501, a pre-processing unit 502, an extraction unit 503, a modulation unit 504, and a driving circuit 505 that are connected in sequence. A lighting component 506 and three coils 507 are connected with the driving circuit 505 for receiving power.

The sensing unit 501 can acquire an audio signals and convert the audio signals into electronic signals. The pre-processing unit 502 pre-processes the electronic signals. The extraction unit 503 generates the characteristic parameters of the electronic signals and the modulation unit 504 modulates a control signal according to the characteristic parameters. The driving circuit 505 generates four driving currents according to the control signal. One of the driving currents is provided to the lighting component 506 so that the light emitted from the lighting component 506 varies with the audio signals, and the other three driving currents are provided to coils 507 to generate magnetic forces to a movable magnet.

In one example embodiment, the movable magnet connects with a flame sheet that is illuminated by the lighting component 506 and forms a flame shape image thereon. When the coils 507 are provided with the driving current, they generates magnetic forces to move the magnet. The flame sheet moves with the movable magnet so that the light image projected on the flame sheet by the lighting component 506 varies accordingly.

In the other example embodiment, the lighting component 506 connects with the movable magnet. When the coils 507 are provided with the driving current, they generates magnetic forces to move the magnet and the lighting component 506, so that the light image projected on a flame sheet by the lighting component 506 varies due to the movement of the lighting component 506.

In one example embodiment, the modulation unit 504 further includes a pre-setting module that can provide a pre-determined characteristic parameter for modulating the control signal. Therefore, the light image projected by the lighting component 506 and the magnetic force generated by the coils 507 can be controlled by the pre-determined characteristic parameter when there is no input audio signal, and they can also be controlled by a combination of the pre-determined characteristic parameter together with the characteristic parameter extracted from the audio signals, and thus achieve a flexible control of the movement of the lighting device 500.

Figure 6:
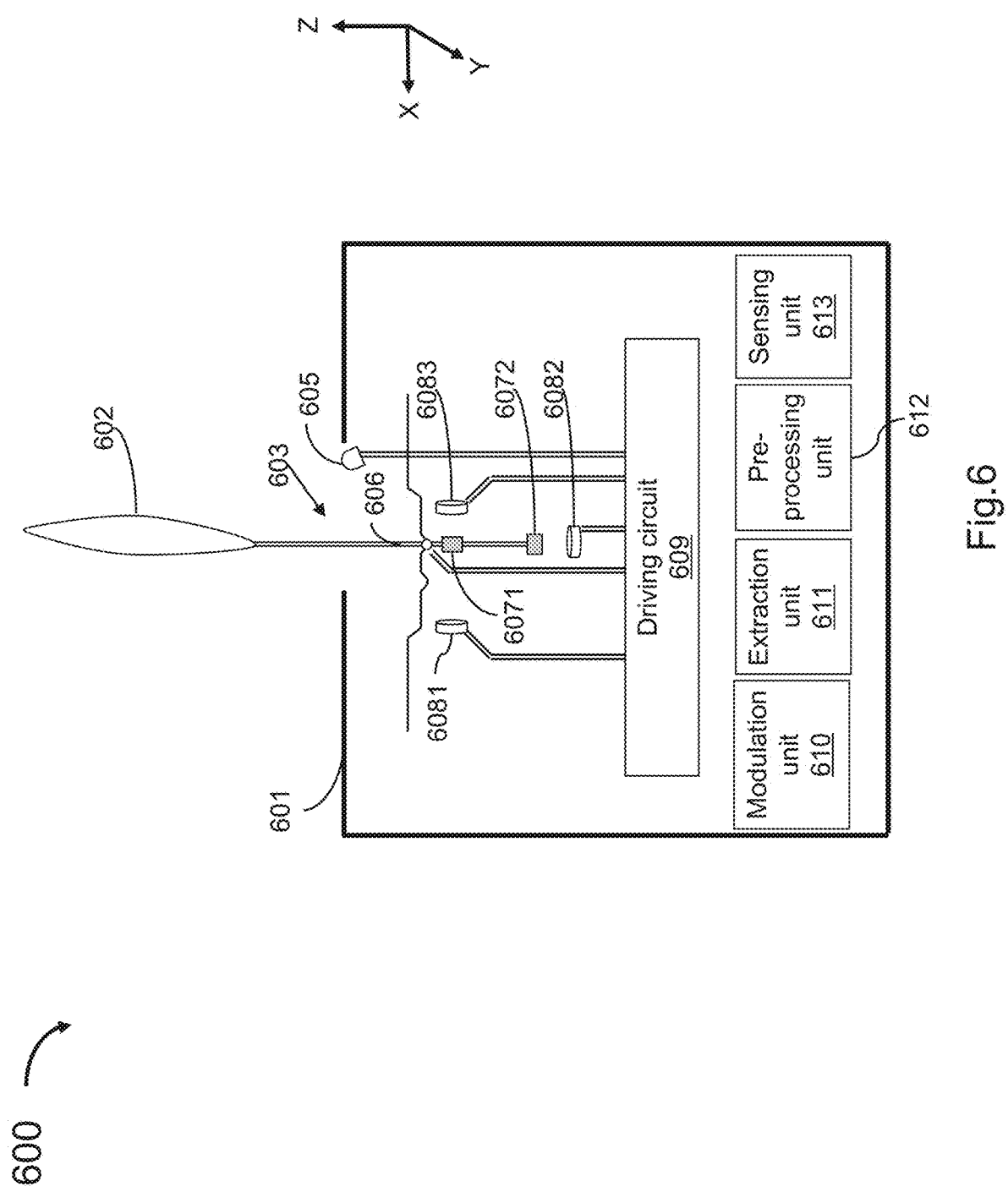
FIG. 6 shows an electronic candle in accordance with an example embodiment.

FIG. 6 shows an electronic candle 600 in accordance with an example embodiment.

Referring to FIG. 6, the electronic candle 600 includes a housing 601 that has an opening 603 on the top surface. A flame sheet 602 is installed on a distal end of a bracket 606 in the housing 601, which extends through the opening 603 to the above of the top surface of the housing 601 so that the flame sheet has at least a part exposing outside of the housing. A lighting component 605 is enclosed inside the housing 601 and can projects light to the flame sheet 602 through the opening 603.

The flame sheet 602 is connected with a first magnet 6071 and a second magnet 6072 by a bracket 606. The bracket 606 can sway, shake or vibrate with the flame sheet 602 and the magnet 6071 and 6072. Two coils 6081 and 6083 are placed adjacent to the first magnet 6071 and one coil 6082 is placed adjacent to the second magnet 6072. The lighting component 605 and all the coils 6081, 6082, and 6083 are connected with and driven by a driving circuit 609. When activated, the coils 6081, 6082 and 6083 can generate magnetic forces to move the magnet 6071 and 6072 so as to move the flame sheet 602.

In one example embodiment, when the sensing unit 613 acquires an audio signal from the environment of the electronic candle 600, it converts the audio signal into an electronic signal. The pre-processing unit 612 optimizes the electronic signal by pre-processing. The extraction unit 611 extracts the characteristic parameters of the electronic signal, which includes one or more of an amplitude, a frequency and an envelope of the electronic signal for the modulation unit 610 to modulate the parameter such as pulse width and frequency of a control signal. The control signal is then input into the driving circuit 609 to generate four driving currents, one of which is provided to the lighting component 605 for illumination and the other three are provided to the coils 6081, 6082 and 6083 for generating magnetic forces to move the magnet 6071 and 6072. As a result, the light image projected on the flame sheet 602 varies with the lighting intensity and flickering frequency of the lighting component 605, and varies with the movement of the flame sheet 602. The light image sways and oscillates with the audio signal to exhibit a realistic flame with varying angles, intensities and flickering frequencies that is harmonized with the environmental sound.

By way of example, the coil 6081, the coil 6083 and the magnet 6071 are collinear such that the coil 6081 and the coil 6083 generate a magnetic force on the magnet 6071 to move the magnet 6071 in X and −X direction; and the coil 6082 generates a magnetic force on the magnet 6072 in Z direction, so that the flame sheet 602 can sway horizontally and vibrates vertically.

By way of example, the coil 6081 is placed along the X axis and the coil 6083 is placed along the Y axis, in which the X axis, the Y axis and the Z axis are perpendicular to each other. The coil 6081 generates a magnetic force on the magnet 6071 to move the magnet 6071 in X or −X direction. The coil 6083 generates a magnetic force on the magnet 6071 to move the magnet 6071 in Y or −Y direction.

By way of example, a larger amplitude of the electronic signal results in a larger amplitude of the driving current, and further results in larger lighting intensity of the lighting component 605 and larger swaying magnitude of the flame sheet 602. Alternatively, a larger amplitude of the electronic signal can result in a higher frequency of the driving current, so that the lighting component 605 flickers in a higher frequency and the flame sheet 602 sways more rapidly. Other characteristic parameters of the electronic signal, such as the frequency of the electronic signal, the envelope amplitude and envelope frequency of the electronic signals, can control the amplitude and frequency of the driving current in a similar way and thus can control the lighting intensity of the lighting component 605, and the movement of the flame sheet 602.

Example embodiments can use one or more characteristic parameter to control both the amplitude and frequency of the driving current. Further, the amplitude and the frequency of the driving current can be controlled respectively by different characteristic parameters. When two or more characteristic parameter are combined to control the driving current, a weight value can be set among the effects of the characteristic parameters.

In one example embodiment, the lighting component 605 can be driven by another power supply other than the driving circuit, such as a regulated direct current (DC) circuit.

In one example embodiment, when the driving circuit 609 stops driving the coils, the flame sheet 602 keeps swaying due to the inertia.

Figure 7:
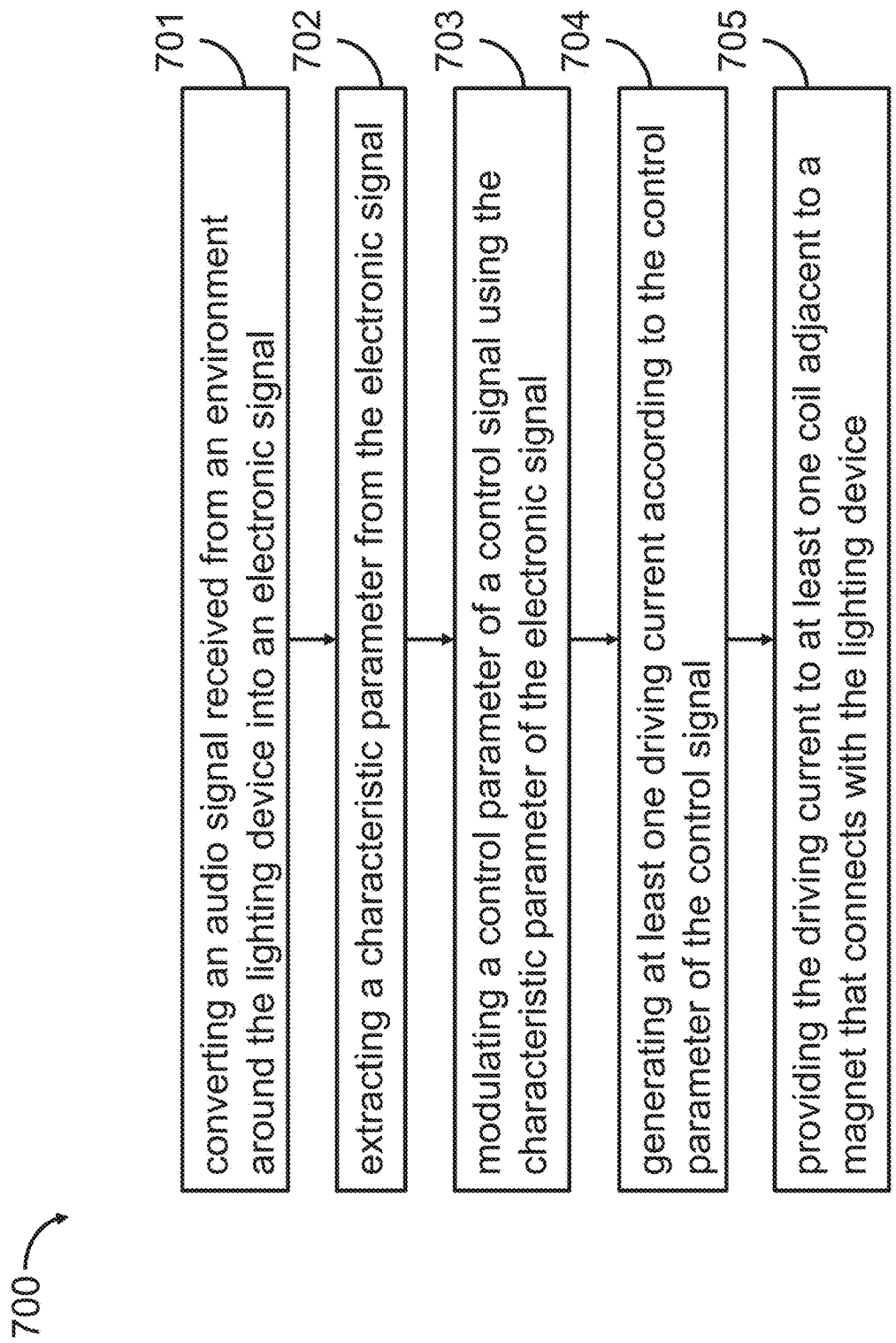
FIG. 7 shows a method for controlling a light image generated from a lighting device in accordance with an example embodiment.

FIG. 7 shows a method 700 for controlling at least one light image generated from at least one lighting device in accordance with an example embodiment.

By way of example, there are a plurality of lighting device of the example embodiment to generate a plurality of light images that move in response to one audio source.

Block 701 states converting an audio signal received from an environment around the lighting device into an electronic signal.

In one example embodiment, an audio transducer such as a microphone acquires the audio signal and converts the audio signal into an electronic signal.

Block 702 states extracting a characteristic parameter from the electronic signal.

In one example embodiment, the characteristic parameter of the electronic signal includes one or more of the amplitude, the frequency and the envelope of the electronic signal. The characteristic parameter is extracted by an extraction unit using signal processing methods.

Block 703 states modulating a control parameter of a control signal using the characteristic parameter of the electronic signal.

In one example embodiment, a modulation unit modulates the control signal using one or more characteristic parameter.

By way of example, the characteristic parameter modulates the control parameter of the control signal to provide a plurality of driving currents to a plurality of coils adjacent to the plurality of the lighting devices, each light image is moved independently accordingly to the characteristic parameter.

In one example embodiment, the control signal is modulated by a pre-determined characteristic parameter that is generated by a pre-setting module.

By way of example, the pre-determined characteristic parameter modulates the control parameter of the control signal to provide a plurality of driving currents to a plurality of coils adjacent to the plurality of the lighting devices, each light image is moved independently accordingly to the pre-determined characteristic parameter.

In one example embodiment, the control signal is modulated by a combination of the characteristic parameter extracted from the electronic signal and the pre-determined characteristic parameter generated by a pre-setting module.

In one example embodiment, one or more of the amplitude, pulse width and frequency of the control signal is modulated.

Block 704 states generating at least one driving current according to the control parameter of the control signal.

In one example embodiment, the amplitude and frequency of the driving current varies with the control signal.

Block 705 states providing the driving current to the coil adjacent to a magnet that connects with the lighting device.

In one example embodiment, at least one coil and at least one magnet is included in the lighting device and interact with each other. The magnetic force changes in response to the characteristic parameter.

In one example embodiment, the magnet connects with a lighting component in the lighting device, and the lighting component moves in response to the magnetic force so that the light image flickers.

In one example embodiment, the magnet connects with a flame sheet in the lighting device, so that the flame sheet sways and vibrates with the magnet in response to the magnetic force.

In one example embodiment, more than one driving current is provided to more than one lighting device respectively so that all the lighting devices can flicker simultaneously according to the same audio signal In one example embodiment, the driving circuit electronically connects with the lighting device to provide a power supply so that the intensity and flickering frequency of the light emitted from the lighting device changes in response to a change in the power supply.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein. Further, figures and other information show example structures and the parts described in one figure can be added or exchanged with the parts in other figures. Further yet, specific numerical data values (such as specific quantities, numbers, categories, etc.) or other specific information should be interpreted as illustrative for discussing example embodiments. Such specific information is not provided to limit example embodiments.

For example, the coils 6081 and 6083 in FIG. 6 can be placed in any positioned to generate the magnetic field around the magnet 6071 to displace the magnet 6071 in any direction.

For example, in another example embodiment, the larger amplitude of the electronic signal can result in a smaller amplitude or lower frequency of the driving current by modulating the control signal.

What is claimed is:
1. A lighting device, comprising:
a movable magnet;
a flame sheet;
a lighting component that connects with the movable magnet to project light on the flame sheet from different positions;

at least one coil that is disposed adjacent to the movable magnet to apply a magnetic force to move the movable magnet in response to a driving current in the coil;

a sensing unit that acquires an audio signal from an audio source and converts the audio signal into an electronic signal;

an extraction unit that electrically connects with the sensing unit for extracting a characteristic parameter from the electronic signal; and a driving circuit that connects with the coil and the lighting component to provide the driving current according to the characteristic parameter, wherein the characteristic parameter includes one or more of an amplitude, a frequency and an envelope of the electronic signal, wherein the lighting component moves with a speed and a direction controlled by the audio signal.

2. The lighting device of claim 1, further comprising:
a modulation unit that electrically connects with the extraction unit for generating a control signal according to the characteristic parameter, wherein the control signal controls the driving current.

3. The lighting device of claim 2, further comprising:
a pre-processing unit that includes an amplifier, a filter and an A/D converter for pre-processing the electronic signal before extracting the characteristic parameter from the electronic signal.

4. The lighting device of claim 1, further comprising one or more of:
an amplitude extraction unit that electrically connects with the driving circuit, wherein the amplitude of the electronic signal is extracted by the amplitude extraction unit;
a frequency extraction unit that that electrically connects with the driving circuit, wherein the frequency of the electronic signal is extracted by the frequency extraction unit; and
an envelope extraction unit that electrically connects with the driving circuit, wherein the envelope of the electronic signal is extracted by the envelope extraction unit.

5. The lighting device of claim 2, wherein the modulation unit further comprises:
a pre-setting module that connects with the driving circuit for providing a pre-determined characteristic parameter, wherein the pre-determined characteristic parameter modulates the control signal.

6. The lighting device of claim 1, further comprising:
three coils that are disposed adjacent to the movable magnet, wherein each coil generates one of three orthogonal magnetic forces on the movable magnet.

7. The lighting device of claim 1, further comprising:
a lens that is positioned between the lighting component and the flame sheet, so that the light projected through the lens on the flame sheet forms a flame shape.

8. A method of using an audio signal for controlling at least one light image generated from at least one lighting device, comprising:
converting, by a sensing unit, an audio signal received from an environment around the lighting device into an electronic signal;
extracting, by an extraction unit, a characteristic parameter from the electronic signal;
modulating, by a modulation unit, a control parameter of a control signal according to the characteristic parameter of the electronic signal;

generating, by a driving circuit, at least one driving current according to the control parameter of the control signal; and providing, by the driver circuit, the driving current to at least one coil adjacent to a magnet that connects with the lighting device so that the coil applies a magnetic force on the magnet, providing, by the driver circuit, the driving current to the lighting device so that the intensity of the light image varies with the driving current, wherein the characteristic parameter includes one or more of an amplitude, a frequency and an envelope of the electronic signal, wherein the magnetic force changes in response to the characteristic parameter, wherein the lighting device moves in response to the magnetic force so that the light image flickers.

9. The method of claim 8, further comprising:
amplifying, by an amplifier in a pre-processing unit, the electronic signal;
filtering, by a filter in the pre-processing unit, the electronic signal; and
converting, by an A/D converter in the pre-processing unit, the electronic signal from an analog signal into a digital signal.

10. The method of claim 8, further comprising:
providing, by a pre-setting module, a pre-determined characteristic parameter for modulating the control parameter of the control signal.

11. The method of claim 10, wherein the audio signal controls a movement of a plurality of light images generated from a plurality of lighting devices,
wherein the pre-determined characteristic parameter modulates the control parameter of the control signal to provide a plurality of driving currents to a plurality of coils adjacent to the plurality of the lighting devices, each light image is moved independently accordingly to the pre-determined characteristic parameter.

12. The method of claim 8, further comprising:
providing, by the driver circuit, the driving current to three coils, wherein two of the three coils are adjacent to a first magnet that connects with the lighting device to move the lighting device in a first horizontal direction and a second horizontal direction, one of the three coils is adjacent to a second magnet that connects with the lighting device to oscillate the lighting device.

13. The method of claim 8, wherein the driving circuit electrically connects with the lighting device to provide a power supply, wherein an intensity of the light emitted from the lighting device changes in response to a change in an amount of the power supply.

14. An electronic candle that produces an image of a candle flame that flickers with an audio signal, comprising:
a housing that has a top surface with an opening;
a sensing unit in the housing, wherein the sensing unit acquires the audio signal from an environment of the electronic candle and converts the audio signal into an electronic signal;
a flame sheet on the top surface of the housing adjacent to the opening;
a lighting component that projects light on the flame sheet to produce the image of the candle flame through the opening;
at least one magnet enclosed inside the housing, wherein a movement of the magnet changes an optical path from the lighting component to the flame sheet;

at least one coil that is disposed adjacent to the magnet to generate a magnetic force to move the magnet when a driving current is passing through the coil;

a driving circuit that electrically connects with the coil for providing the driving current according to a control signal;

a modulation unit that electrically connects with the driving circuit, wherein the modulation unit modulates the control signal according to a characteristic parameter of the electronic signal; and an extraction unit that electronically connects with the modulation unit, wherein the extraction unit extracts the characteristic parameter from the electronic signal that is converted from the audio signal, wherein the characteristic parameter of the electronic signal includes one or more of an amplitude, a frequency and an envelope of the electronic signal to cause the image of the candle flame resembles ignition, growth, spread, decay and extinction of a real candle flame.

15. The electronic candle of claim 14, wherein the sensing unit comprises an audio transducer for converting the audio signal into the electronic signal.

16. The electronic candle of claim 14 further comprising:
a bracket that connects the magnet and the flame sheet, so that the flame sheet moves when the magnetic force is applied on the magnet.

17. The electronic candle of claim 14, further comprising:
a bracket that connects the magnet and the lighting component, so that the lighting component moves when the magnetic force is applied on the magnet; and
a lens that is positioned between the lighting component and the flame sheet to generate the image of the candle flame.

18. The electronic candle of claim 14, further comprising:
a bracket that connects a first magnet, a second magnet and the lighting component,
a first coil disposed adjacent to the first magnet to apply a first magnetic force on the first magnet so that the lighting component moves in a horizontal direction; and
a second coil disposed adjacent to the second magnet to apply a second magnetic force on the second magnet so that the lighting component vibrates.

19. The electronic candle of claim 14, wherein the modulation unit further comprises:
a pre-setting module that provides a pre-determined characteristic parameter, wherein the pre-determined characteristic parameter further modulates the control signal.

20. The electronic candle of claim 14, further comprising:
a pre-processing unit that includes an amplifier for amplifying the electronic signal, a filter for filtering the electronic signal and an A/D converter for converting the electronic signal from an analog signal into a digital signal.

* * * * *